US 7,793,156 B2

(12) United States Patent
Tsurumi et al.

(10) Patent No.: US 7,793,156 B2
(45) Date of Patent: Sep. 7, 2010

(54) SYSTEM AND METHOD TO FACILITATE AUTOMATIC GLOBALIZATION VERIFICATION TEST

(75) Inventors: Teppei Tsurumi, Cary, NC (US); Yu Wang, Beijing (CN); John F. Sefler, Morrisville, NC (US); Jeff Weiss, Chapel Hill, NC (US); Morgan Johnson, Durham, NC (US); Al Chakra, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 11/828,459

(22) Filed: Jul. 26, 2007

(65) Prior Publication Data

US 2009/0031170 A1    Jan. 29, 2009

(51) Int. Cl.
*G06F 11/00* (2006.01)
(52) U.S. Cl. ........................................ 714/38
(58) Field of Classification Search ............. None
See application file for complete search history.

(56) References Cited

U.S. PATENT DOCUMENTS

| | | | | |
|---|---|---|---|---|
| 5,499,335 | A | 3/1996 | Silver et al. | 715/703 |
| 5,664,206 | A | 9/1997 | Murow et al. | 704/8 |
| 6,185,729 | B1 | 2/2001 | Watanabe et al. | 717/100 |
| 6,425,123 | B1 | 7/2002 | Rojas et al. | 717/136 |
| 6,983,238 | B2 | 8/2002 | Gao | 704/8 |
| 6,507,812 | B1 | 1/2003 | Meade et al. | 704/8 |
| 6,530,039 | B1 * | 3/2003 | Yang | 714/38 |
| 6,691,100 | B1 | 2/2004 | Alavi et al. | 707/2 |
| 6,745,348 | B2 | 6/2004 | Chung et al. | 714/47 |
| 6,920,630 | B2 | 7/2005 | Jackson | 717/168 |
| 6,931,628 | B2 | 8/2005 | McGeorge, Jr. | 717/124 |
| 6,934,908 | B2 | 8/2005 | Fox et al. | 715/513 |
| 6,938,259 | B2 | 8/2005 | McGeorge, Jr. | 717/313 |
| 7,024,365 | B1 | 4/2006 | Koff et al. | 704/270.1 |
| 7,299,452 | B1 * | 11/2007 | Zhang et al. | 717/124 |
| 7,389,223 | B2 * | 6/2008 | Atkin et al. | 704/8 |
| 7,509,318 | B2 * | 3/2009 | Shaath et al. | 707/6 |
| 7,543,189 | B2 * | 6/2009 | Fichter et al. | 714/38 |
| 2003/0212982 | A1 | 11/2003 | Brooks et al. | 717/100 |
| 2008/0155502 | A1 * | 6/2008 | Chang et al. | 717/115 |

OTHER PUBLICATIONS

R. Fruen et al., "Dynamic Management of Resources for Different National Languages," UK Disclosure UK8960173, 1997.

\* cited by examiner

*Primary Examiner*—Michael C Maskulinski
(74) *Attorney, Agent, or Firm*—Hamilton & Terrile, LLP; Gary W. Hamilton

(57) ABSTRACT

A method, system and program are disclosed for validating the generation of globalized versions of software programs. The directory structure of an installed software program is traversed to discover resource files containing globalized strings. The values of the globalized string and its corresponding key in the resource file are then used to generate a unique key, formatted to identify the location of the globalized string. The locale supported by the globalized string is determined and the unique key and the globalized string value are appended to a corresponding locale table. A globalized string value that causes the failure of a globalization test for a predetermined locale is identified. The corresponding locale table is then searched for the failed globalized string value. Once found, the unique key for the failed globalized string value is retrieved to identify the location of the defective globalized string and perform predetermined remedial actions.

20 Claims, 5 Drawing Sheets

SYSTEM AND METHOD TO FACILITATE AUTOMATIC GLOBALIZATION VERIFICATION TEST

BACKGROUND OF THE INVENTION

1. Field of the Invention

Embodiments of the disclosure relate in general to the field of computers and similar technologies, and in particular to software utilized in this field. Still more particularly, it relates to validating the generation of globalized versions of software programs.

2. Description of the Related Art

Many of today's commercial software programs are marketed on a global basis. As such, they often require localization to address the specific needs of different markets, regions, or countries. Localization efforts generally require more than translating text in a software program's user interface. In addition, translation of text, dates, times, numbers, and currency values must be displayed in the customary format for the locale. Furthermore, the software program must also be able to operate with the local character encoding standard. These efforts can be time consuming, tedious and expensive, especially when dealing with complex software programs that need to support multiple locales.

One approach to internationalizing software programs to support multiple locales is to store locale-specific information in a separate localization file. As the software program's code is executed, the locale-specific information is simply read from the appropriate localization file and used accordingly. One advantage to this approach is that the information in the localization file can be modified without disturbing the internationalized executable code, and likewise, the executable code can be modified without disturbing the locale-specific information. These localization files may be in any number of formats, including compiled message catalogs, HTML files, and Java resource bundles that include properties files.

Properties files are of particular interest to Global Verification Testers since they can be examined to validate the localization process. However, it is not unusual for large software programs to have many properties files authored by many developers located across many geographies. As a result, it can be very cumbersome to find the exact source file that is displaying a defective localization text string or other information. Currently, there is no simple method for global verification testers to uniquely index text values for all languages. Instead, they are required to manually search through both the resource library (e.g., CMVC, Clearquest, etc.) and the installed software program (e.g., properties, classes, JAR and WAR files, etc.).

BRIEF SUMMARY OF THE INVENTION

A method, system and computer readable medium are disclosed for validating the generation of globalized versions of software programs. In various embodiments of the invention, a globalization file scanner traverses the directory structure of an installed software program to discover resource files containing globalized strings. File processing operations are performed on each resource file comprising a globalized string to determine the value of the globalized string and its corresponding globalized string key. Key generation operations are then performed on the globalized string and its corresponding globalized string key value in the resource file to generate a new, unique key, that identifies the location of the globalized string.

In one embodiment, the globalized string and its corresponding globalized string key are contained in a properties or class file which is further contained in an archive file such as a Java Archive (JAR), Web Archive (WAR), or Enterprise Archive (EAR) file. In yet another embodiment, the globalized string and its corresponding key are contained in an extensible mark-up language (XML) file which is further contained in an archive file such as a JAR, WAR, or EAR file.

Once the unique key is generated and formatted, the locale supported by the globalized string is determined, and the unique key and the globalized string value are appended to a corresponding locale table. During testing operations, globalized string values that create failures are identified, along with their supported locales. The corresponding locale table is then accessed and searched for the failed globalized string value. Once found, the corresponding unique key for the failed globalized string value is located and retrieved to identify the location of the defective globalized string. The location of the defective globalized string is identified and predetermined remedial actions are performed. In one embodiment, the defects in the globalized string are repaired. In another embodiment, the test failure, the failed globalized string value, its corresponding unique key, the location of the defective globalized string, and the defective globalized string itself are logged in a globalization test log file. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
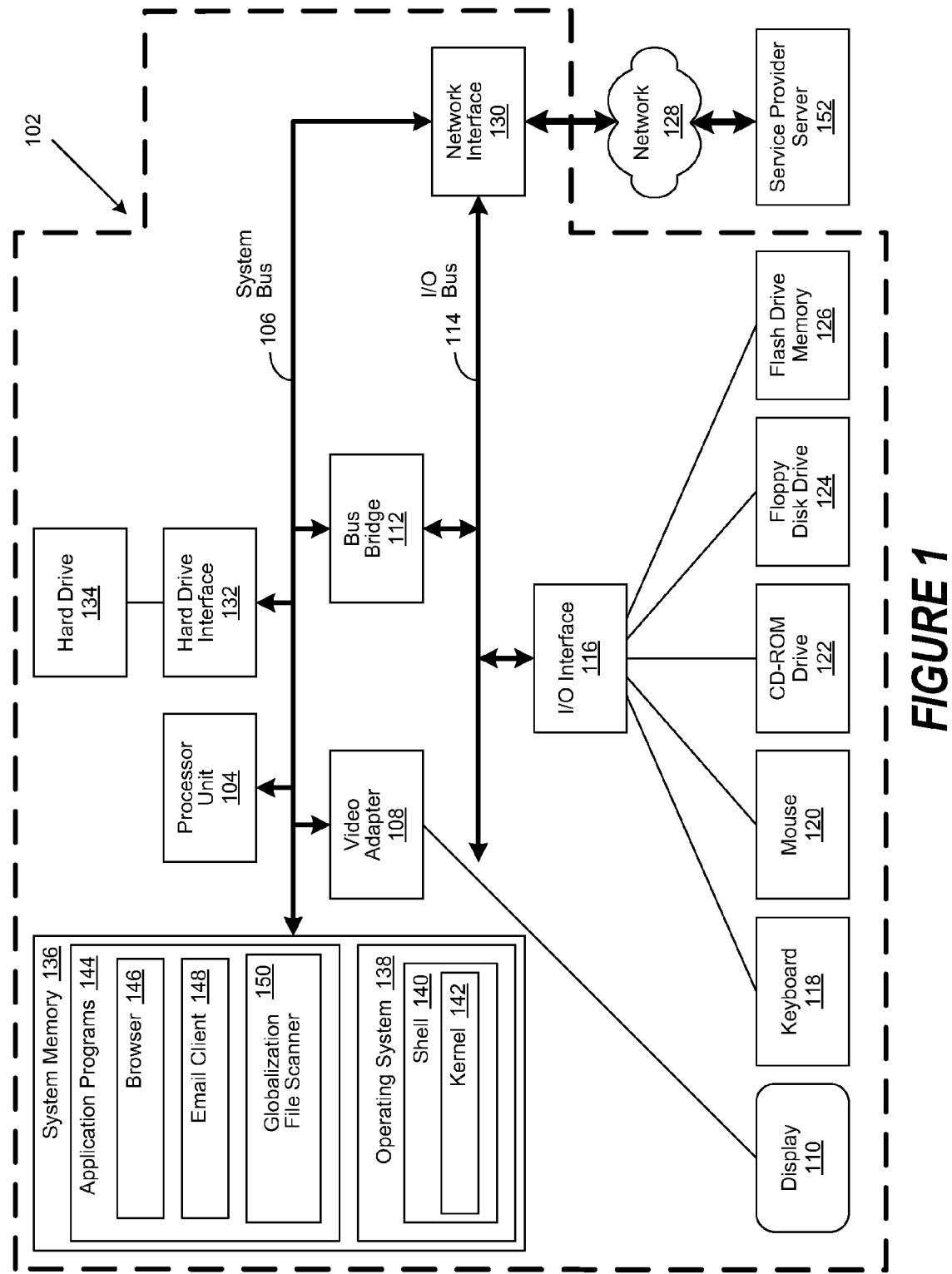
FIG. 1 depicts an exemplary client computer in which the present invention may be implemented.

A method, system, and program are disclosed for validating the generation of globalized versions of software programs. As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102, operating system (OS) 138, and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a globalization file scanner 150. Globalization file scanner 150 includes code for implementing the processes described in FIGS. 2-4 described hereinbelow. In one embodiment, client computer 102 is able to download globalization file scanner 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
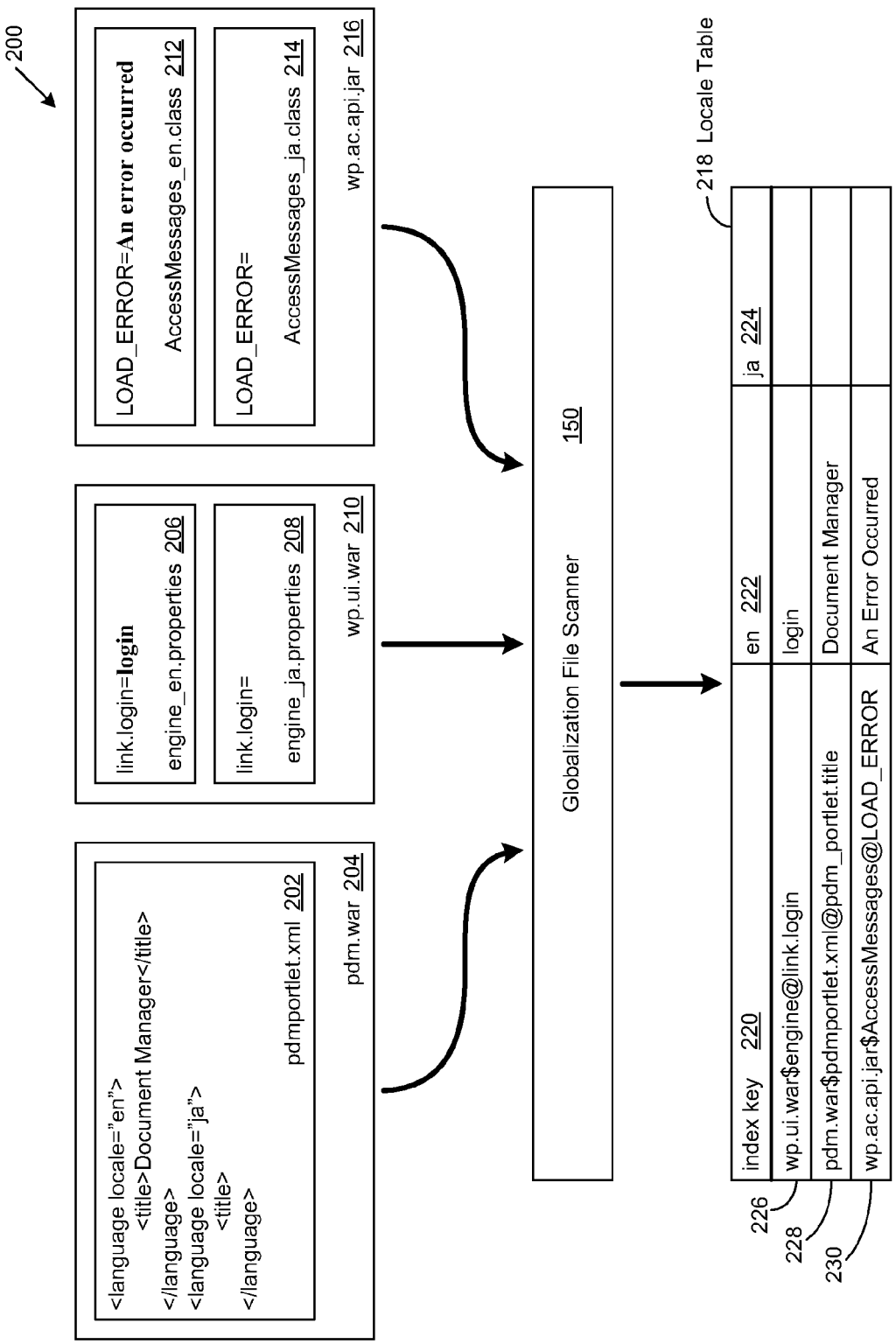
FIG. 2 is a simplified block diagram of processing of resource files using a globalization file scanner as implemented in accordance with an embodiment of the invention.

FIG. 2 is a simplified block diagram of a globalization file scanner 200 as implemented in accordance with an embodiment of the invention. In this embodiment, pdm.war 204 is a Web Archive (WAR) file comprising a globalized string stored as an extended mark-up language (XML) file 202. Similarly, wp.ui.war 210 is a WAR file comprising properties files 206, 208, which further comprise globalized strings. Also, wp.ac.api.jar 216 is a Java Archive (JAR) file comprising class files 212, 214, which further comprise globalized strings.

As the globalization file scanner 150 traverses the directory structure of an installed software program (not shown), it identifies resource files 204, 210, 216. As each of the resource files 204, 210, 216 are examined by the globalization file scanner 150, it is determined that they respectively comprise globalized strings 204, 206, 208, 212, and 214.

File processing operations are performed on each of the globalized strings 204, 206, 208, 212, 214 to determine their globalized string value and the value of their corresponding key within their respective resource files 204, 210, 216. As they are determined, key generation operations are performed on the globalized string and its corresponding key value in the resource file to generate a new, unique key 220, formatted such that it is configurable to identify the location of the globalized string.

In one embodiment, the unique key is generated using the formula:

unique key={the rightmost archive file name}+$+
{resource file name without language}+@+{the
corresponding key value of the globalized string
in the resource file}

Using this formula, the values "wp.ui.war" 210, "$," "engine" 206, 208, "@"; and "link.login" 206, 208 are combined. As a result, "wp.ui.war$engine@link.login" becomes the unique key 220, which is appended to locale table 218 along with the English globalization string value "login" 222 and the Japanese globalization string value " " 224 as table row 226.

In another embodiment, the unique key is generated using the formula:

unique key={the rightmost archive file name}+$+
{xml file name}+@+{the unique identifier of the
globalized string in the xml file}

Using this formula, the values "pdm.war" 204, "$," "pdm-portlet.xml" 202, "@," and "pdm_portlet.title" are combined. As a result, "pdm.war$pdmportlet.xml@pdm_portlet.title" becomes the unique key 220, which is appended to locale table 218 along with the English globalization string value "Document Manager" 222 and the Japanese globalization string value " " 224 as table row 228.

In yet another embodiment, the unique key is generated using the formula:

unique key={the rightmost archive file name}+$+
{resource file name without language}+@+{the
corresponding key value of the globalized string
in the resource file}

Using this formula, the values "wp.ac.api.jar" 216, "$," "AccessMessages" 212, 214, "@"; and "LOAD ERROR" 212, 214 are combined. As a result, "wp.ac.api.jar$AccessMessages@LOAD_ERROR" becomes the unique key 220, which is appended to locale table 218 along with the English globalization string value "An Error Occurred" 222 and the Japanese globalization string value " " 224 as table row 230.

Accordingly, the resulting locale table 218 comprises rows 226, 228, 230, which further comprise unique keys 220, the English globalized string value 222, and the Japanese globalized string value 224. Globalized string values 222, 224 that cause failures during globalization testing of a software program can be located in locale table 218 and their corresponding unique key 220 can be retrieved. Once retrieved, the globalization file scanner 150 can examine the retrieved unique key 220 to determine the location of the corresponding defective globalized string 206, 208, 212, 214 contained by resource files 204, 210, 216.

Figure 3:
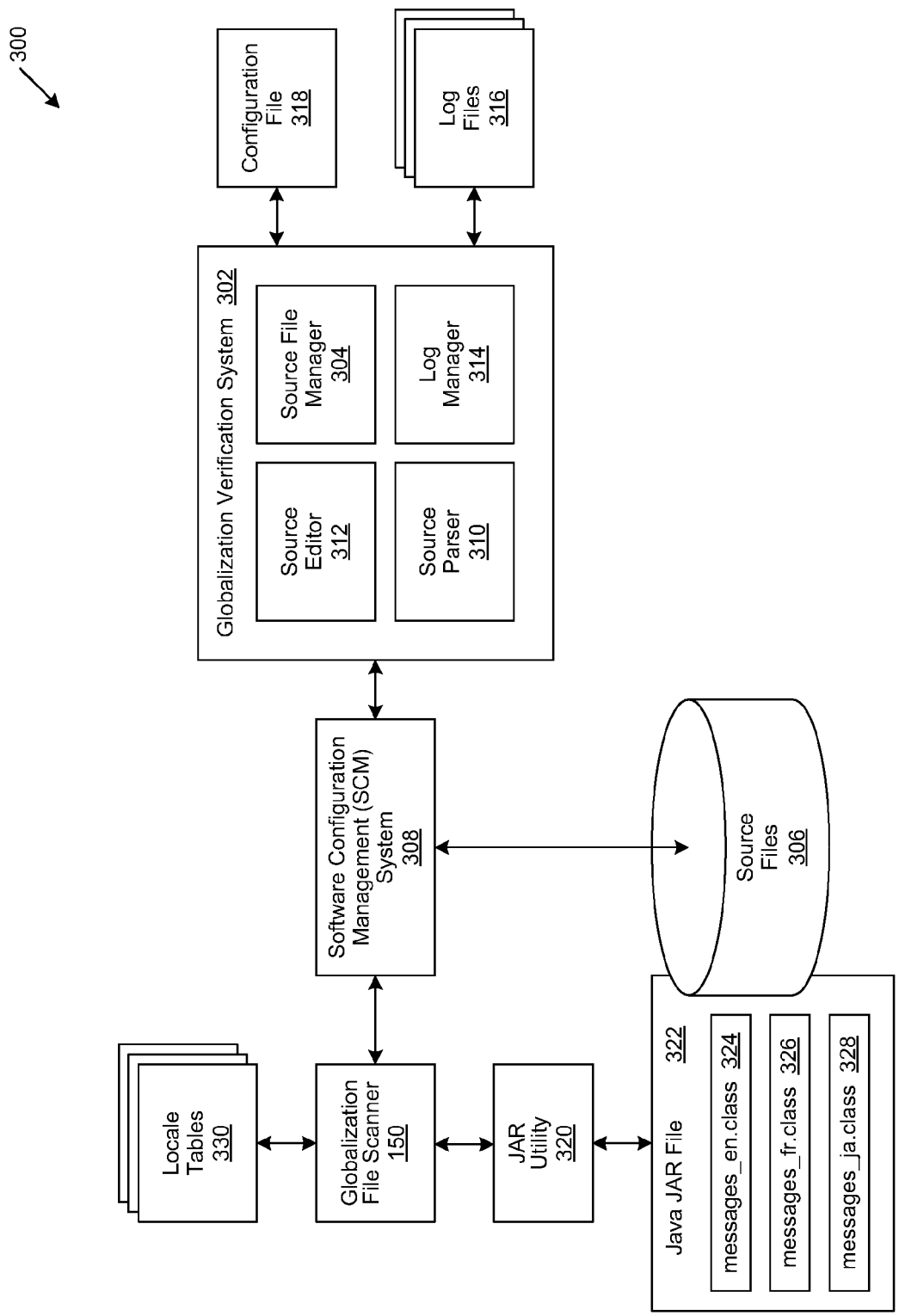
FIG. 3 is a simplified block diagram of a globalization verification test system as implemented in accordance with an embodiment of the invention.

FIG. 3 is a simplified block diagram of a globalization verification test system 300 as implemented in accordance with an embodiment of the invention. Globalization resource files including messages_en.class 324 for English, messages_fr.class 326 for French, and messages_ja.class 328 for Japanese are contained in Java Archive (JAR) file 322. As described in greater detail herein, globalization file scanner utilizes JAR utility 320 to search JAR file 322 for globalization resource files 324, 326, 328 to determine whether they comprise one or more globalized strings. When a globalized string is found, file processing operations are performed to determine the value of the globalized string and its corresponding key within the globalization resource file 324, 326, 328. Key generation operations are then performed to generate unique keys, which are formatted to describe the location of the globalized strings contained in globalization resource file 324, 326, and 328. Once the unique key is generated and formatted, the locale supported by the globalized string is determined. Once determined, the unique key and the value of the globalized string are appended to a predetermined locale table 330 corresponding to the locale supported by the globalized strings. For example, if it is determined that the supported locale of a globalized string is French, then the unique key and the value of the globalized string are appended to a locale_fr table. Similarly, if the supported locale is Japanese, then the unique key and the value of the globalized string are appended to a locale_ja table.

Globalization verification system 302 comprises configuration file 318 for storing user preference and configuration parameters that determine the manner in which the globalization verification system 302 operates. Globalization verification system 302 also comprises source file manager 304 for interacting with source files 306 via a software configuration management (SCM) system 308. Skilled practitioners of the art will recognize that source files for software program development environments are often maintained within an SCM system 308. In the course of developing source code modules and associated support files, a software developer may locally edit, compile, or perform other operations on the source files 306. These source files 306 typically comprise JAR file 322, further comprising globalization resource files 324, 326, 328. Globalized messages or strings are generally stored within one or more globalization resource files 324, 326, 328, which may comprise a variety of file formats as required by a given software program development system or runtime environment. Therefore, a source file may be any type of file from which a globalized string may be retrieved for use by a software program, including globalization testing and verification.

Those of skill in the art will be aware that globalized strings typically comprise an informational text string typically used to inform the user of an error, a warning, or other information. A globalized string may also comprise a text string for use as menu items, labels, window titles, or other software program-related user interface information. In addition, globalized strings may also comprise binary code that renders a graphical image (e.g., an icon, etc.), or generates a resulting action, when executed at run-time. Once it is determined that the source files 306 meet predetermined requirements, such as appearing to perform processing tasks as required without error, they are submitted to the SCM system 308, which archives and further manages the source files 306 thereafter.

To verify the globalization of a software program, newly submitted resource files (e.g., 324, 326, 328) containing globalized strings are combined with previously tested source files (e.g., 306) prior to testing by the globalization verification system 302. Once combined, globalization tests are performed to verify that the software program meets predetermined testing criteria and parameters for a predetermined locale. If a globalization test is determined to be unsuccessful, then the globalized string value that caused the failure of the globalization test is identified. Once identified, the locale that the globalized string value supports is identified, and the corresponding locale table 330 is accessed by the globalization file scanner 150. As an example, if it is determined that the supported locale of the globalized string causing the failure is French, then the locale_fr table is accessed. Similarly, if the supported locale is Japanese, then the locale_ja table is accessed.

Once the corresponding locale table 330 has been accessed, the locale table 330 is searched for the failed globalized string value. Once found, the corresponding unique key for the failed globalized string value is located and retrieved. The globalization file scanner 150 then uses the retrieved unique key to identify the location of the defective globalized string. Once the location of the defective globalized string is identified, the globalization file scanner 150 provides the location of the defective globalized string to the SMC system 308, which manages the retrieval of the corresponding resource file 324, 326, 328. The retrieved resource file is then conveyed to the source file manager 304. Source parser 310 comprises rules for parsing the resource files 324, 326, 328 to locate and retrieve the defective globalized string which is then conveyed to source editor 312 for remedial operations. In one embodiment, source editor 312 comprises a graphical user interface (GUI) that allows the user to edit the globalized string to remedy the defects of the globalized string. In another embodiment, the globalization test failure, the failed globalized string value, its corresponding unique key, the location of the defective globalized string, and the defective globalized string itself are logged in one or more globalization test log files 316 by log manager 314.

Figure 4A:
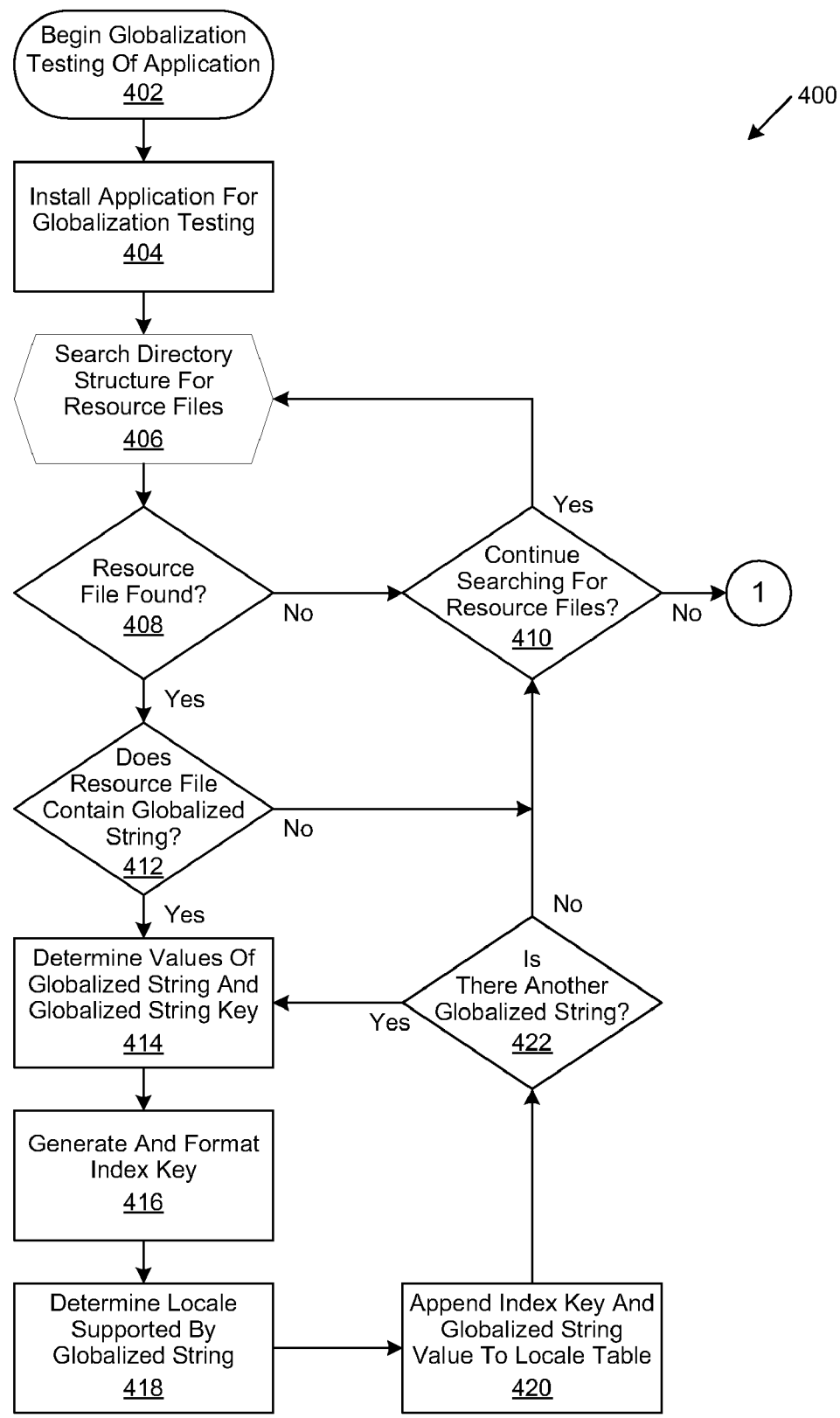
FIGS. 4*a-b* are a generalized flowchart of a globalization file scanner as implemented in accordance with an embodiment of the invention.
Figure 4B:
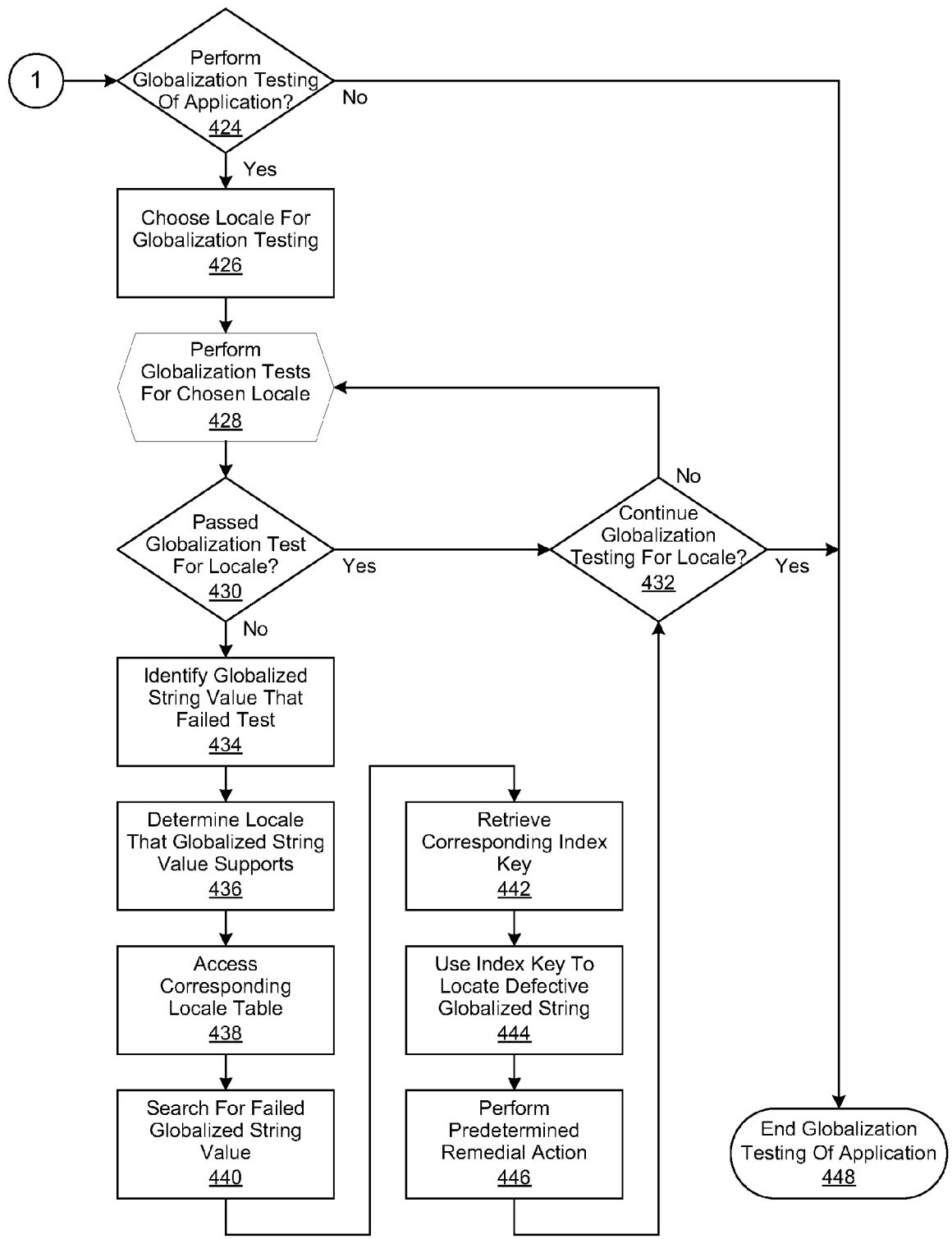

FIGS. 4a-b are a generalized flowchart of a globalization file scanner 400 as implemented in accordance with an embodiment of the invention. In various embodiments, globalization testing of a software program begins in step 404, followed by installing the software program to be tested in step 404. Once installed, the globalization file scanner traverses the directory structure of the installed software program in step 406 to discover resource files.

If it is determined in step 408 that a resource file has not been discovered, then a determination is made in step 410 whether to continue searching for resource files. If so, then the process is repeated, beginning with step 406. If not, then the process continues, beginning with step 424, where it is determined whether to perform globalization testing of the software program. However, if it is determined in step 408 that a resource file has been discovered, then a determination is made in step 412 whether the discovered resource file comprises one or more globalized strings. If it does not, then a determination is made in step 410 whether to continue searching for resource files. If so, then the process is repeated, beginning with step 406. If not, then the process continues, beginning with step 424, where it is determined whether to perform globalization testing of the software program.

If it is determined in step 412 that the resource file comprises one or more globalized strings, then file processing operations are performed in step 414 on the resource file to determine the values of the globalized string and its corresponding key in the resource file. In step 416, key generation operations are performed on the globalized string and its corresponding key value in the resource file to generate a new, unique key, formatted such that it is configurable to identify the location of the globalized string.

In one embodiment, the globalized string and its corresponding key are contained in a properties or class file which is further contained in an archive file such as a Java Archive (JAR), Web Archive (WAR), or Enterprise Archive (EAR) file. In this embodiment, the unique key is generated using the formula:

unique key={the rightmost archive file name}+$+
{resource file name without language}+@+{the
corresponding key value of the globalized string
in the resource file}

As an example, for a sample key and the English value of a properties file in a WAR file:

Input Resource File:

<PortalServer>\installableApps\lwp.peoplefinder.jsr168.war\WEB-INF\classes\nls\PeopleFinderUI_en.properties Input File Content:

Add=Add

Output Result File:

<PortalServer>\Portal_ResourceBundles\result.properties

Output Result File Contents:

lwp.peoplefinder.jsr168.war$PeopleFinderUI@Add=Add

As an example, for a sample key and the English value of a class file in a JAR file:

Input Resource Bundle File:

<PortalServer>\shared\app\wp.ac.api.jar\com\ibm\wps\ac\resources\AccesssControlMessages_en.class

CMVC:

base/wp/code/wp.ac.api/src/com/ibm/wps/ac/resources/AccessControlMessages_en.nlsprops Input Pile Content:

LOAD_RESOURCE_TYPE_ERROR_1=EJPSB0076E: An error occurred while loading ResourceType {0}.

Output Result File:

wp.ac.api.jar$AccessControlMessages@LOAD_RESOURCE_TYPE_ERROR_1=EJPSB0076E: An error occurred while loading ResourceType {0}.

In another embodiment, the globalized string and its corresponding key are contained in a properties or class file that is not contained in an archive file such as a JAR, WAR, or EAR file. In this embodiment, the unique key is generated using the formula:

unique key={the rightmost directory name}+$+{resource file name without language}+@+{the
corresponding key value of the globalized string
in the resource file}

Those of skill in the art will realize that some directory names may contain meaningless values, such as WEB-INF, nls, classes, etc. In these cases, the directory values are ignored.

As an example of a sample key and the English value of a properties file not contained in a JAR file:
Input Resource File:
<Portal>\shared\app\nls\CSRes_en.properties
Input File Contents:
CS_RES_PA.ShowProfile=ShowProfile
Output Result File Contents:
app$CSRes@CS_RES_PA. Showprofile=Show Profile In yet another embodiment, the globalized string and its corresponding key are contained in an extensible mark-up language (XML) file which is further contained in an archive file such as a JAR, WAR, or EAR file. In this embodiment, the unique key is generated using the formula:

unique key={the rightmost archive file name}+$+ {xml file name}+{the unique identifier of the globalized string in the xml file}

As an example of a sample key and the English value of an xml file contained in a WAR file:
Input Resource File:
<PortalServer>\installableApps\SearchAdmin.war\WEB-INF\portlet.xml
Input File Content:

```
<concrete-portlet href="#Portlet_5">
  <portlet-name>Manage Search Admin Portlet</portlet-name>
  <default-locale>en</default-locale>
  <!- - @portlets.JuruSearch._Portlet_5@- - >
  <language locale="en">
    <title>Manage Search </title>
    <title-short>Manage Search</title-short>
    <description>Search administration to configure and deploy search</description>
    <keywords>search, website, crawl, scope, custom link, search service</keywords>
    <language>
    <config-param>
      <param-name>helpjsp</param-name>
  <param-value>WEB-INF/jsp/html/juruPortletHelp.-jsp</param-value>
    <config-param>
  <concrete-portlet>
```

Output result File contents:
SearchAdmin.war$portlet.xml@Manage_Search_Admin_Portlet.title=Manage Search Once the unique key is generated and formatted in step 416, the locale supported by the globalized string is determined in step 418. Once determined, the unique key and the corresponding value of the globalized string are appended in step 420 to a predetermined locale table. For example, if it is determined that the supported locale of a globalized string is French, then the unique key and the value of the globalized string are appended to a locale_fr table. Similarly, if the supported locale is Japanese, then the unique key and the value of the globalized string are appended to a locale_ja table. Once the unique key and the value of the globalized string have been appended to the predetermined locale table, a determination is made in step 422 if the resource file comprises another globalized string. If it does, then the process is repeated, beginning with step 414. Otherwise, a determination is made in step 410 whether to continue searching for resource files. If so, then the process is repeated, beginning with step 406. If not, then the process continues, beginning with step 424, where it is determined whether to perform globalization testing of the software program.

If it is determined in step 424 to not perform globalization testing, then globalization testing of the software program is ended in step 448. Otherwise, a locale is chosen in step 426 for globalization testing of the software program, and globalization tests for the chosen locale are begun in step 428. If it is determined in step 430 that the globalization test was successful, then it is determined in step 432 whether to continue globalization testing. If it is decided to continue testing, then the process is repeated, beginning with step 428. Otherwise, globalization testing of the software program is ended in step 448. If it is determined in step 430 that the globalization test was not successful, then the globalized string value that caused the failure of the globalization test is identified in step 434. Once identified, the locale that the globalized string value supports is identified in step 436 and the corresponding locale table is accessed by the globalization file scanner in step 438. As an example, if it is determined that the supported locale of the globalized string causing the failure is French, then the locale_fr table is accessed. Similarly, if the supported locale is Japanese, then the locale_ja table is accessed.

Once the corresponding locale table has been accessed in step 438, the locale table is searched for the failed globalized string value in step 440. Once found, the corresponding unique key for the failed globalized string value is located and retrieved in step 442. The globalization file scanner then uses the retrieved unique key in step 444 to identify the location of the defective globalized string. Once the location of the defective globalized string is identified, predetermined remedial actions are performed in step 446. In one embodiment, the defects in the globalized string are remedied. In another embodiment, the test failure, the failed globalized string value, its corresponding unique key, the location of the defective globalized string, and the defective globalized string itself are logged in a globalization test log file. Once the predetermined remedial actions are performed in step 446, a determination is made in step 432 whether to continue globalization testing of the software program. If it is decided to continue testing, then the process is repeated, beginning with step 428. Otherwise, globalization testing of the software program is ended in step 448.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for testing of software, comprising:
    providing a plurality of resource files, wherein at least one of said resource files comprises a globalized string and a first key;
    searching said plurality of resource files to identify the resource file comprising a globalized string and the first key;
    processing the file comprising the globalized string and the first key to obtain a globalized string value and a first key value;
    generating a second key value using said globalized string value and said first key value, wherein said second key value corresponds to the location of the globalized string;
    testing said plurality of resource files; and
    using the second key value to determine the location of said globalized string upon detection of an error condition caused by said globalized string.

2. The method of claim 1, further comprising:
    appending the second key value and the globalized string value to a locale result table corresponding to the locale supported by the globalized string; and
    accessing the locale result table to determine the location of the globalized string upon detection of the error condition caused by the globalized string.

3. The method of claim 1, wherein at least one resource file of said plurality of resource files is stored in an archive file, said archive file comprising an archive file name that is used to generate said second key.

4. The method of claim 1, wherein at least one resource file of said plurality of resource files is stored in its native file format, said native file format comprising a resource file name that is used to generate said second key.

5. The method of claim 1, wherein said at least one resource file is an extensible mark-up language (XML) file stored in an archive file, said archive file comprising an archive file name that is used to generate said second key.

6. The method of claim 1, wherein upon detection of an error caused by the globalized string, the globalized string value, the second key value and the location of the globalized string are logged in a globalization test log file.

7. A system comprising:
    a processor;
    a data bus coupled to the processor; and
    a computer-usable medium embodying computer program code, the computer-usable medium being coupled to the data bus, the computer program code validating the generation of globalized versions of software and comprising instructions executable by the processor and configured for:
        providing a plurality of resource files, wherein at least one of said resource files comprises a globalized string and a first key;
        searching said plurality of resource files to identify the resource file comprising a globalized string and the first key;
        processing the file comprising the globalized string and the first key to obtain a globalized string value and a first key value;
        generating a second key value using said globalized string value and said first key value, wherein said second key value corresponds to the location of the globalized string;
        testing said plurality of resource files; and
        using the second key value to determine the location of said globalized string upon detection of an error condition caused by said globalized string.

8. The system of claim 7, further comprising:
    appending the second key value and the globalized string value to a locale result table corresponding to the locale supported by the globalized string; and
    accessing the locale result table to determine the location of the globalized string upon detection of the error condition caused by the globalized string.

9. The system of claim 7, wherein at least one resource file of said plurality of resource files is stored in an archive file, said archive file comprising an archive file name that is used to generate said second key.

10. The system of claim 7, wherein at least one resource file of said plurality of resource files is stored in its native file format, said native file format comprising a resource file name that is used to generate said second key.

11. The system of claim 7, wherein said at least one resource file is an extensible mark-up language (XML) file stored in an archive file, said archive file comprising an archive file name that is used to generate said second key.

12. The system of claim 7, wherein upon detection of an error caused by the globalized string, the globalized string value, the second key value and the location of the globalized string are logged in a globalization test log file.

13. A tangible computer-usable medium embodying computer program code, the computer program code comprising computer executable instructions configured for:
    providing a plurality of resource files, wherein at least one of said resource files comprises a globalized string and a first key;
    searching said plurality of resource files to identify the resource file comprising a globalized string and the first key;
    processing the file comprising the globalized string and the first key to obtain a globalized string value and a first key value;
    generating a second key value using said globalized string value and said first key value, wherein said second key value corresponds to the location of the globalized string;
    testing said plurality of resource files; and using the second key value to determine the location of said globalized string upon detection of an error condition caused by said globalized string.

14. The tangible computer usable medium of claim 13, further comprising:
appending the second key value and the globalized string value to a locale result table corresponding to the locale supported by the globalized string; and
accessing the locale result table to determine the location of the globalized string upon detection of the error condition caused by the globalized string.

15. The tangible computer usable medium of claim 13, wherein at least one resource file of said plurality of resource files is stored in an archive file, said archive file comprising an archive file name that is used to generate said second key.

16. The tangible computer usable medium of claim 13, wherein at least one resource file of said plurality of resource files is stored in its native file format, said native file format comprising a resource file name that is used to generate said second key.

17. The tangible computer usable medium of claim 13, wherein said at least one resource file is an extensible markup language (XML) file stored in an archive file, said archive file comprising an archive file name that is used to generate said second key.

18. The tangible computer usable medium of claim 13, wherein upon detection of an error caused by the globalized string, the globalized string value, the second key value and the location of the globalized string are logged in a globalization test log file.

19. The tangible computer usable medium of claim 13, wherein the computer executable instructions are deployable to a client computer from a server at a remote location.

20. The tangible computer usable medium of claim 13, wherein the computer executable instructions are provided by a service provider to a customer on an on-demand basis.

* * * * *